United States Patent [19]
Emerson et al.

[11] Patent Number: 5,845,276
[45] Date of Patent: Dec. 1, 1998

[54] DATABASE LINK SYSTEM

[75] Inventors: Michael Gene Emerson, Eden Prairie; Kelly Reed Westman, Minneapolis, both of Minn.; Sushil Pallai, Bombay, India

[73] Assignee: FDC, Inc., Minneapolis, Minn.

[21] Appl. No.: 580,473

[22] Filed: Dec. 29, 1995

Related U.S. Application Data

[63] Continuation of Ser. No. 141,285, Oct. 22, 1993, abandoned.

[51] Int. Cl.$^6$ ..................................................... G06F 17/30
[52] U.S. Cl. .................................... 707/2; 707/3; 707/101
[58] Field of Search ..................................... 707/3, 2, 101

[56] References Cited

U.S. PATENT DOCUMENTS

| | | | |
|---|---|---|---|
| 3,964,029 | 6/1976 | Babb | 707/6 |
| 4,751,635 | 6/1988 | Kret | 707/10 |
| 4,782,325 | 11/1988 | Jeppsson et al. | 341/55 |
| 4,785,400 | 11/1988 | Kojima et al. | 707/100 |
| 4,930,071 | 5/1990 | Tou et al. | 707/4 |
| 5,185,857 | 2/1993 | Rozmanith et al. | 707/507 |
| 5,201,046 | 4/1993 | Goldberg et al. | 707/100 |
| 5,202,985 | 4/1993 | Goyal | 707/4 |
| 5,222,235 | 6/1993 | Hintz et al. | 707/101 |
| 5,222,236 | 6/1993 | Potash et al. | 707/102 |
| 5,226,165 | 7/1993 | Martin | 707/6 |
| 5,263,159 | 11/1993 | Mitsui | 707/5 |
| 5,299,197 | 3/1994 | Schlafly | 370/395 |
| 5,404,507 | 4/1995 | Bohm et al. | 707/4 |
| 5,428,737 | 6/1995 | Li et al. | 707/4 |

OTHER PUBLICATIONS

"Microsoft Press Computer Dictionary" second edition, Microsoft Press, p31, Oct. 1993.

Oski, "Muse Makes Databases Sing: Occam Research's Easy–To–Use Data–Analysis Tool Brings Flexible Reporting To Users of Corporate Databases", Feb. 24, 1992, p. 37(3).

Winchell, "FoxPro 2.0's Rushmore: Here's How FoxPro 2.0's New Technology Speeds Queries, And When It Works Best", Sep., 1991, p. 54(6) v.4 Issue 10 DBMS.

"Rushmore's Bald Spot", Sep., 1991, v4 n10 p. 58(1) DBMS.

Batory, "On Searching Transposed Files", Dec. 1979, ©1979 pp. 531–544 see 531–533 ACM T.D.S. vol. 4 No. 4.

Morgan, Brian, "Business Objects", DBMS, v5, M10, Sep. 1992, pp. 28(2).

Motorola, "MC88110 Second Generation RISC Microprocessor User's Manual" 1991, pp. 9–70, 10–1, 2–3, 10–4, 2–25.

Hamilton, D. *Inside ADABAS Direct Calls, Introduction to ADASQL*, 1991, pp. 27–37 & 49–65.

Cowart, Robert, *Mastering Windows 3.1 Special Edition* c1992 c1993 pp. 235–237.

(List continued on next page.)

*Primary Examiner*—Thomas G. Black
*Assistant Examiner*—Jack M. Choules
*Attorney, Agent, or Firm*—Sidley & Austin

[57] ABSTRACT

A method and system are provided for direct marketer personnel to enhance query performance. The query is performed on modified relational database data stored as contiguous data fields across all records in the database. The queries are performed using a process called bitmapping. A bitmap is a series of computer words strung together in a one dimensional array. It looks at data as a series of bits rather than a higher level data type such as an integer or floating point value. The system also provides the ability to provide a system that permits data segmentation, ad hoc requests, and systematic research. The system is also capable of producing a suite of reports that are specific to the needs of direct marketers. These include reports on RFM information (recency of last purchase, frequency of purchases, and monetary totals of life to date information. These reports are generated on a regular (usually monthly basis) and are used to drive the direct marketing process.

11 Claims, 11 Drawing Sheets

Microfiche Appendix Included
(5 Microfiche, 286 Pages)

OTHER PUBLICATIONS

Thro, Ellen, *The Database Dictionary*, Microtrend Books 1991, pp. 62–63, 180, 224–225.

Heinrich, Joe, *Maps R4000 User's Manual* 1993 pp. 12, A–1, A10.

IEEE, Fourth International Conference on Very Large Data Bases, West Berlin, Germany, Sep. 13–15, 1978, R. Ashany, "Application of Sparse Matrix Techniques to Search, Retrieval, Classification and Relationship Analysis in Large Data Base Systems—Sparcom", pp. 499–516.

| FIELDS | CUSTOMER 1 | CUSTOMER 2 | CUSTOMER 3 | CUSTOMER 4 | CUSTOMER 5 | | | | | CUSTOMER 1M |
|---|---|---|---|---|---|---|---|---|---|---|
| STATE | WI | MN | IL | NY | MI | | | | | |
| ZIP | 53206 | 55442 | 60601 | 10708 | 48202 | | | | | |
| AGE | 19 | 26 | 23 | 29 | 24 | | | | | |
| INCOME | 28,000 | 31,000 | 29,000 | 35,000 | 34,000 | | | | | |
| CITY | MILWAUKEE | MINNEAPOLIS | CHICAGO | BROOKLYN | DETROIT | | | | | |
| GENDER | M | F | F | M | F | | | | | |
| . | | | | | | | | | | |
| . | | | | | | | | | | |
| . | | | | | | | | | | |
| FIELD 1000 | | | | | | | | | | |

| CUSTOMER | STATE | ZIP | AGE | IMCOME | CITY | FIELD 1000 |
|---|---|---|---|---|---|---|
| CUSTOMER 1 | WI | 53206 | 19 | 28,000 | MILWAUKEE | |
| CUSTOMER 2 | MN | 55442 | 26 | 31,000 | MINNEAPOLIS | |
| CUSTOMER 3 | IL | 60601 | 23 | 29,000 | CHICAGO | |
| CUSTOMER 4 | NY | 10708 | 29 | 35,000 | BROOKLYN | |
| CUSTOMER 5 | MI | 48202 | 24 | 34,000 | DETROIT | |
| . . . | | | | | | |
| CUSTOMER IM | | | | | | |

DATABASE LINK SYSTEM

This is a continuation of application Ser. No. 08/141,285, filed Oct. 22, 1993 now abandoned.

BACKGROUND OF THE INVENTION

In the direct mailing business, companies maintain very large databases of customers that might range from 1 million to 20 million records. Because these files are so large the direct marketing industry has grown up with very large and simplistic database systems rather than taking advantage of the newer relational technology that is available. By relational technology, it is meant the ability to interrelate various types of information together in a dynamic fashion so that various information about a customer, for example demographics, what products they purchased, when they last purchased, etc. may be interrelated.

Many other industries that use databases for storage of large amounts of information concerning customers have been able to take advantage of relational technology. In some of those industries, for example retail stores, the relational database has worked effectively by segmenting the data into chunks, so that all 2 million of the retail store's customers do not have to be looked at each time a search is performed. Customers can be grouped by individual stores. Another example would be in the banking industry, where banks segment their data such that only customers of one of its branches are reviewed. On the other hand, large direct marketing companies do not segment up their customers. They want to look at patterns that cross all of its millions of customers, making it very difficult to segment up a direct marketing database into chunks while maintaining effective access to the data. At present, a large direct marketing company would typically store its data in large files with one record for each customer. The record would typically be stored on a tape or a mainframe. To illustrate the structure of data stored in the standard relational database, take a database of 1 million customers that contains at least the information on state, zip, age, income, city and gender. A standard database stores data in representative fields within a record for each customer as shown in FIG. 1. Each of the six categories shown are representative of one field. In this example if it is desired to get three points of information, gender, state, and income level, a search of all records for all customers must be performed.

In traditional technology the progression of this search is to pull the first record off the file, extract the three pieces of data from the record, load such data into a table, and proceed to the next record. This process would be repeated 1 million times in a case such as that shown in FIG. 1 having 1 million customers/records. This is a very inefficient process and in the direct marketing context where there could be as many as 750 to 2,000 fields the search can become very time consuming for very simple projects such as the above example.

The computer accesses the queried information in traditional technology by grabbing the entire record, which in some instances may include as many as 750 to 2,000 fields. The record is stored in computer memory and the desired fields, three in this example, are reviewed and followed by a determination of whether this particular record satisfies the query. If the above example had involved 2000 fields and 10 million customers, that would be 20 gigabytes of information that the computer would have to pass through to answer the query. This is a very inefficient process, when considering that most direct marketing data bases are of this size and that most queries involve an average of 6 to 10 fields out of the thousand fields being searched. Therefore, in standard data base searching, when a record is brought into the computer and data is downloaded, there is a large inefficiency ratio when comparing the amount of data searched to that which is actually used.

There are two issues that the present invention attempts to address. First the architecture of the very large files in direct marketing, make it very expensive to answer even the most simple question. So whether the query would acquire a lot of information or is as simple as how many females bought a particular product, the standard database requires that all the records be searched to find such information. This is a very slow and expensive process. The present invention provides a tool that shortens the search time for simpler tasks, performing some in a matter of seconds.

This invention, Database Link™, relates to a system designed to give rapid access to large relational marketing databases. In particular, it is a product designed specifically for professionals in direct marketing who desire to get mission-critical information from large marketing databases. These databases typically have anywhere from 1 million to 25 million customers plus up to 10 times that many additional detail records.

In addition to the large size of these databases, direct marketing has several unique characteristics that make getting information from these files particularly challenging. First, the databases are quite homogenous. As opposed to databases in industries such as banking and finance that can logically organize customers into geographic "lumps", direct marketers look at their customer base in a more monolithic fashion. This reduces the effectiveness of common database strategies which look to segment files to improve response time.

Second, these databases contain a large and growing amount of information on each customer. Direct Marketers are moving towards finer and finer targeting of their promotions which requires huge amounts of information about individuals and households. It is not uncommon to store upwards of a thousand fields on each individual, and the amount of fields will continue to increase at a rate of 25 to 50 per year. This fact, combined with the first point about the monolithic nature of these databases, creates a huge challenge to today's hardware and software technology. Within this challenging environment, Database Link™ is designed to meet the needs of direct marketing professionals.

SUMMARY OF THE INVENTION

According to the invention, a method and system are provided that allow direct marketing personnel to reduce the time and enhance the efficiency of searches performed on direct marketing data records. The user enters a query on an IBM compatible PC, having a client server program that runs under the Microsoft Windows™ environment. After the query has been entered, the client server turns the query into a packet which is sent to the system server.

The server stores data from a standard database in modified form, rotated 90 degrees. Instead of data being stored contiguously for each individual customer listed in the database, as is done in a standard database, the data for each field across all records in the database is stored contiguously.

The queried information is retrieved and processed using a process called bitmapping, which reduces the search time per the complexity of the query in contrast to the standard database system. After data has been captured it is packetized and returned to the client server program where it can be reviewed.

The present invention can also produce a suite of reports that are specific to the needs of direct marketers. These include reports on RFM information (recency of last purchase, frequency of purchases, and monetary totals of life to date information. These reports are generated on a regular (usually monthly basis) and are used to drive the direct marketing process.

The present invention also provides a system that permits data segmentation, ad hoc requests, and systematic research.

BRIEF DESCRIPTION OF THE DRAWINGS

FIG. 5 is an illustration of the spreadsheet of the client server windows software according to the present invention;

FIG. 6 is an illustration of the Build Query box screen of the client server windows software according to the present invention;

FIG. 8 is an illustration of the data tabulation screen of the client server windows software according to the present invention;

DETAILED DESCRIPTION OF SPECIFIC EMBODIMENTS

In the following detailed description of the preferred embodiment, including the computer source code listings of Appendices A–D, reference is made to the accompanying drawings which form a part hereof and in which is shown by way of illustration an exemplary embodiment in which the invention may be practiced. This embodiment is described in sufficient detail to enable those skilled in the art to practice the invention, and it is to be understood that other embodiments may be utilized and that structural or logical changes may be made without departing from the scope of the present invention. The following detailed description is, therefor, not to be taken in a limiting sense, and the scope of the present invention is defined by the appended claims.

For purposes of this application, the stored data that is referred to throughout, is relational database data that has been modified. The relational database data is modified by rotating the data files 90 degrees. Now, instead of data being stored contiguously for each individual customer listed in the database, the data for each field across all records in the database is stored contiguously. In short, each individual record instead of being in columnar form is now stored in rows and each field previously stored as rows is now stored in columnar form.

The Database Links system™, which is the product name for the preferred embodiment of the present invention, is based on a client server system design. The software for this system is described in detail below and this description follows the source code listings found in Appendices A–D. In this paradigm, the processing for the user interface is on a separate computer from the system that actually accesses the data and produces the result that has been requested.

Figure 2:
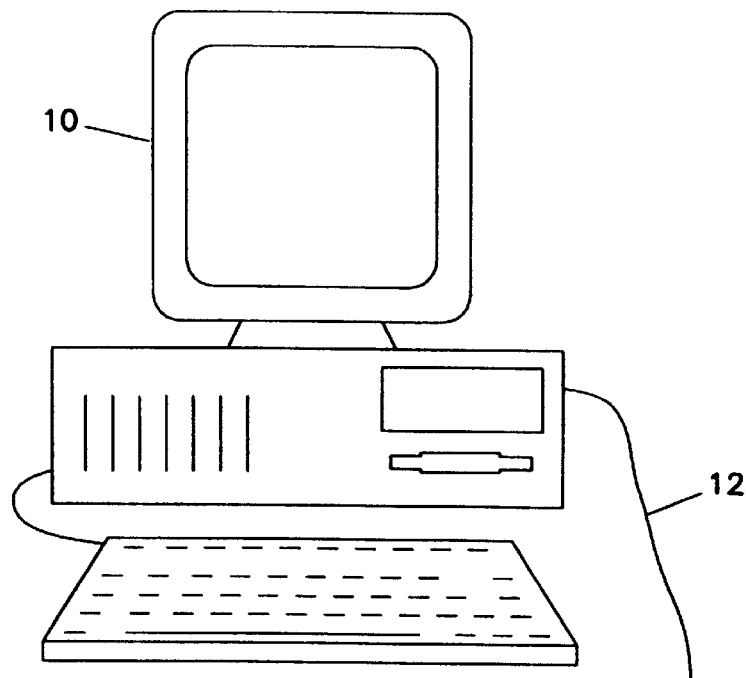
FIG. 2 is a simplified schematic drawing of the Database Link query system.
Figure 2:
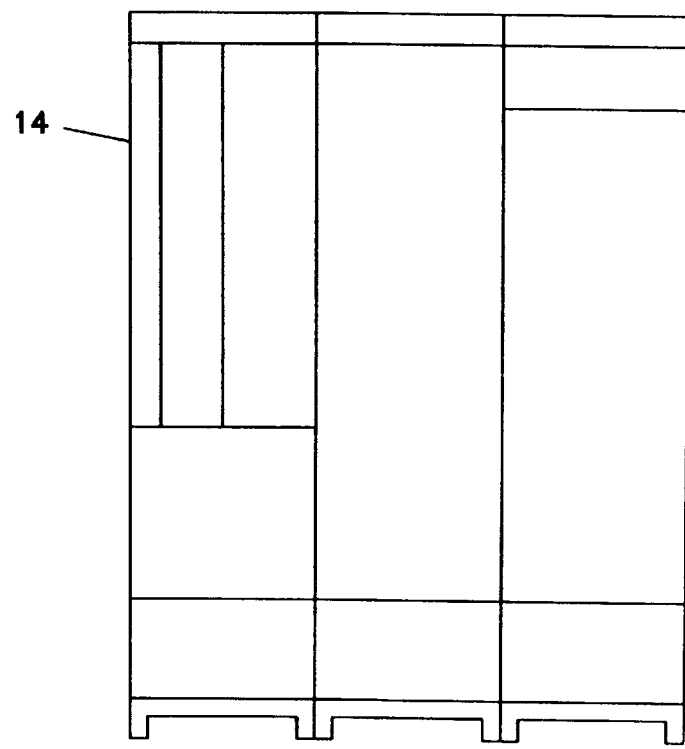

Referring now to FIG. 2, an overview of the invention will be described. The user interface piece resides on an IBM compatible PC 10 and runs under the control of a client windows program in the Microsoft Windows™ environment. The client windows program is built around a sophisticated grammar that models the real world environment of the database marketer. It assists the user in creating queries that are turned into packets and sent to the server 14 processor over a LAN or telephone wire based WAN 12.

Once the server 14 has received a request, it begins to process the data until the results have been completed. The server 14 uses an approach built on bitmaps providing users with the ability to rapidly retrieve data. After the requested data is retrieved, the server 14 puts the results into a packet handling system that delivers the results back to the PC 10 that requested the information.

The Client Windows Program

The client windows program exists to allow easy interface between the user and the database server.

It is based on a basic spreadsheet type of paradigm within the Microsoft Windows environment. The application is designed to be compatible with Windows and meets all of the requirements as specified by Microsoft in their Windows Applications Development document.

The client windows program allows for easy formulation of queries and "packetizes" the information and sends it to the database server for processing. There are two main components to the client windows program: a language parser that enables parsing of complex marketing queries and a spreadsheet/report specification that allows many queries to be organized into one query.

The language parser interprets the DBL grammar. The DBL grammar is based on an industry standard SQL database query specification and adds specific functionality to meet the needs of the Direct Marketing industry.

The Spreadsheet

Figure 5:
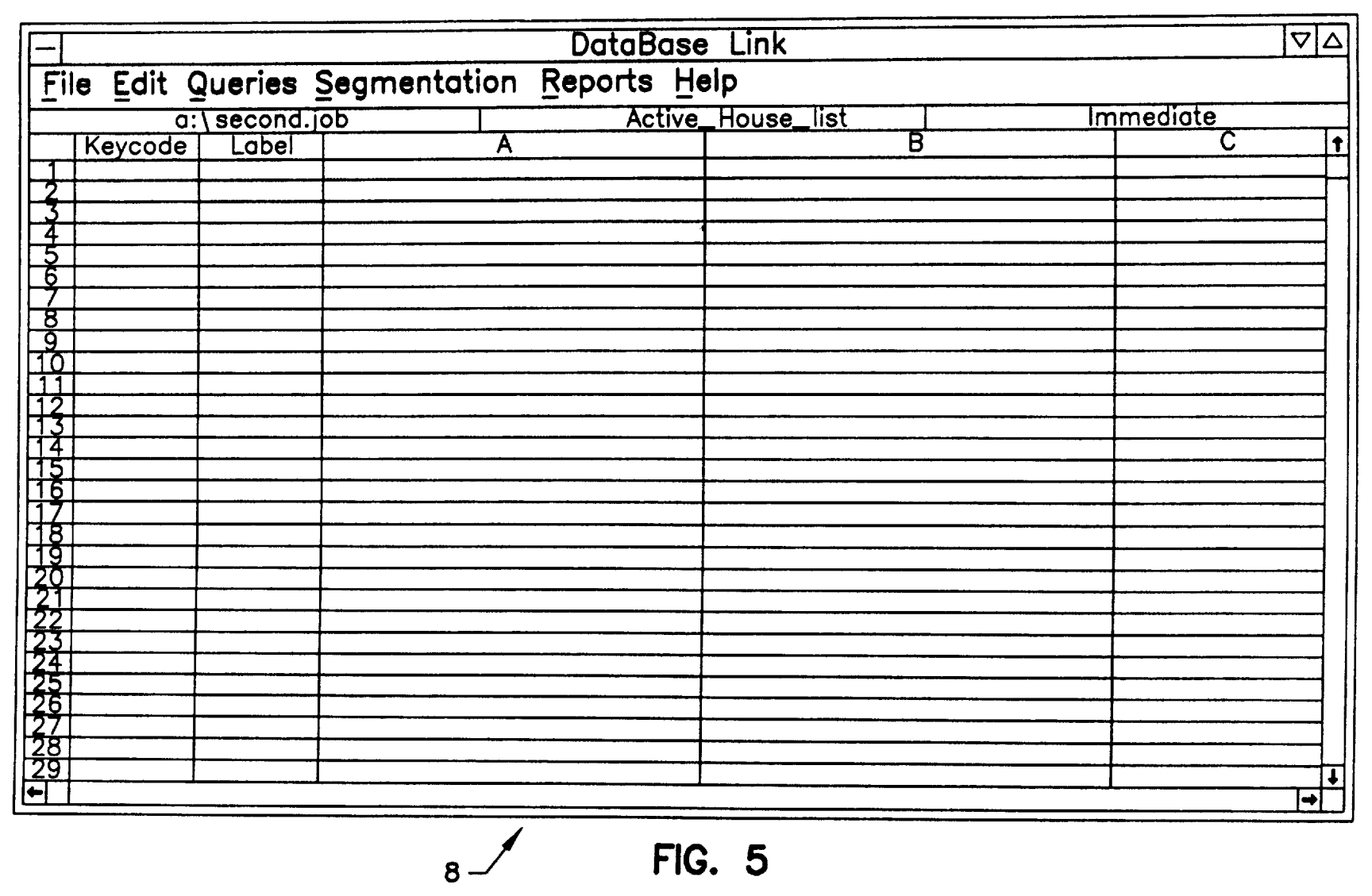

The spreadsheet is what the user sees when entering the Database Links™ application, illustrated in FIG. 5. The spreadsheet allows for the optional storage of queries into batches for submission in one "lump" to the server 14. Each row in the spreadsheet represents one group of customers that are to be selected.

The first two columns are for labeling purposes. The keycode column is a special mnemonic used by marketers for naming groups and the labels column is any label that the user wants to identify a group. Each additional column contains one criteria that defines that particular group. Each of these criteria is "ANDed" together to define a group. Thus, if the first column contained "gender is male" and the second column contained "state is Minnesota", the result for that row would be all males who are from the state of Minnesota.

In addition to this basic functionality, the spreadsheet has all of the standard spreadsheet functionality built into Windows applications. This includes the capability to cut, copy, and paste cells, rows, and columns. Rows and columns may be inserted as desired. Database Links™ allows the user to proof the queries contained within each cell to make sure they are grammatically correct queries.

Building Queries

Figure 6:
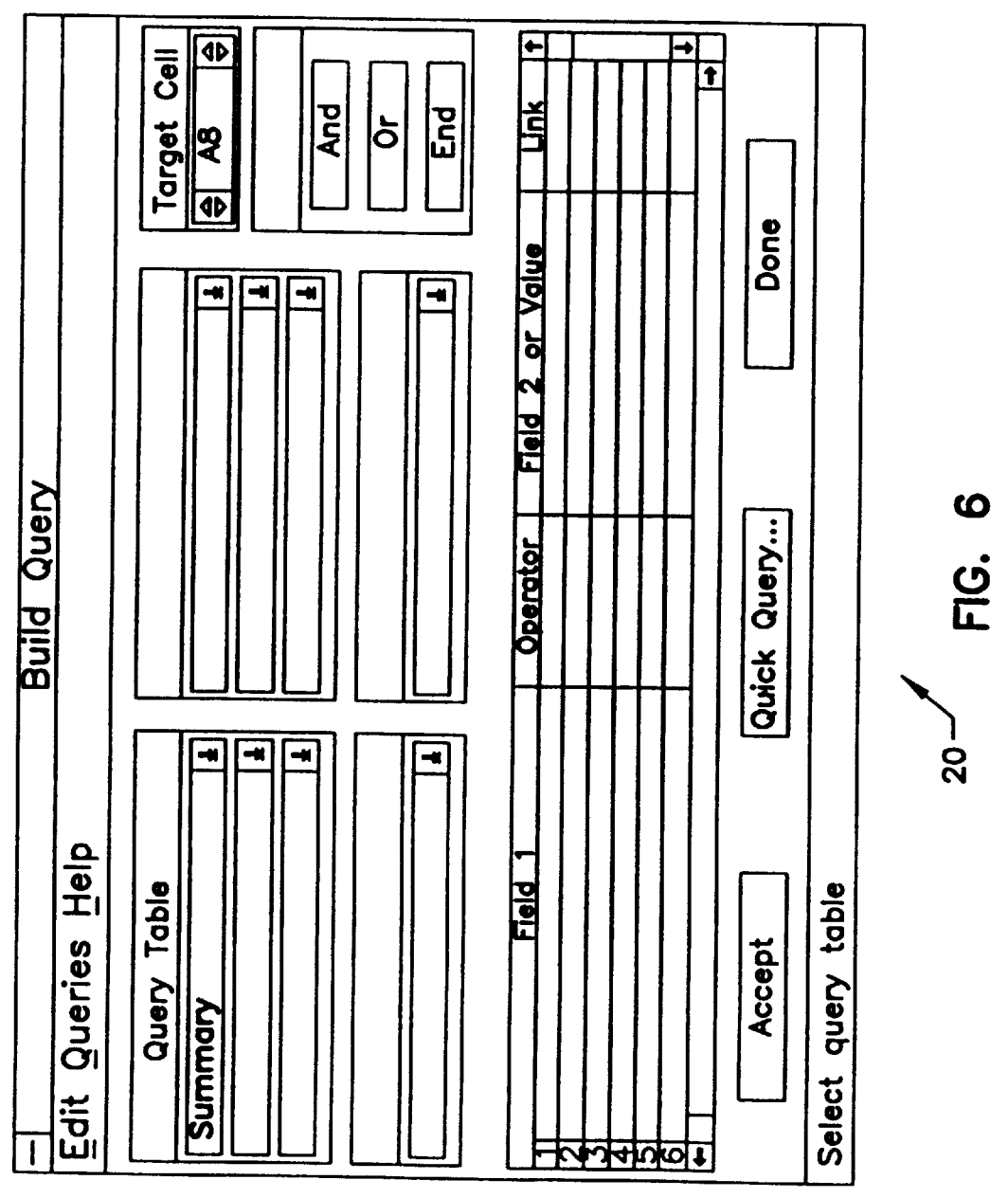

The user is provided a "point and click" dialog box for the actual creation of queries to send to the database. The Build Query box is shown in FIG. 6. These queries can be sent directly to the database for processing or they might be saved to the spreadsheet where they might be submitted in a batch.

The Build Query dialog box moves the user through several steps starting with the selection of Query Table in the far upper left-hand part of the box. Once the table has been selected, all of the fields that are contained in that table appear in the second line which is currently empty. Once the field has been selected, a list of valid operators appears in the third line. Finally the user enters the actual value in the fourth line. Pieces of queries are then accumulated into a total query in the bottom spreadsheet connected with and's/ or's as selected on the far left side of the box.

Distributions

Figure 7:
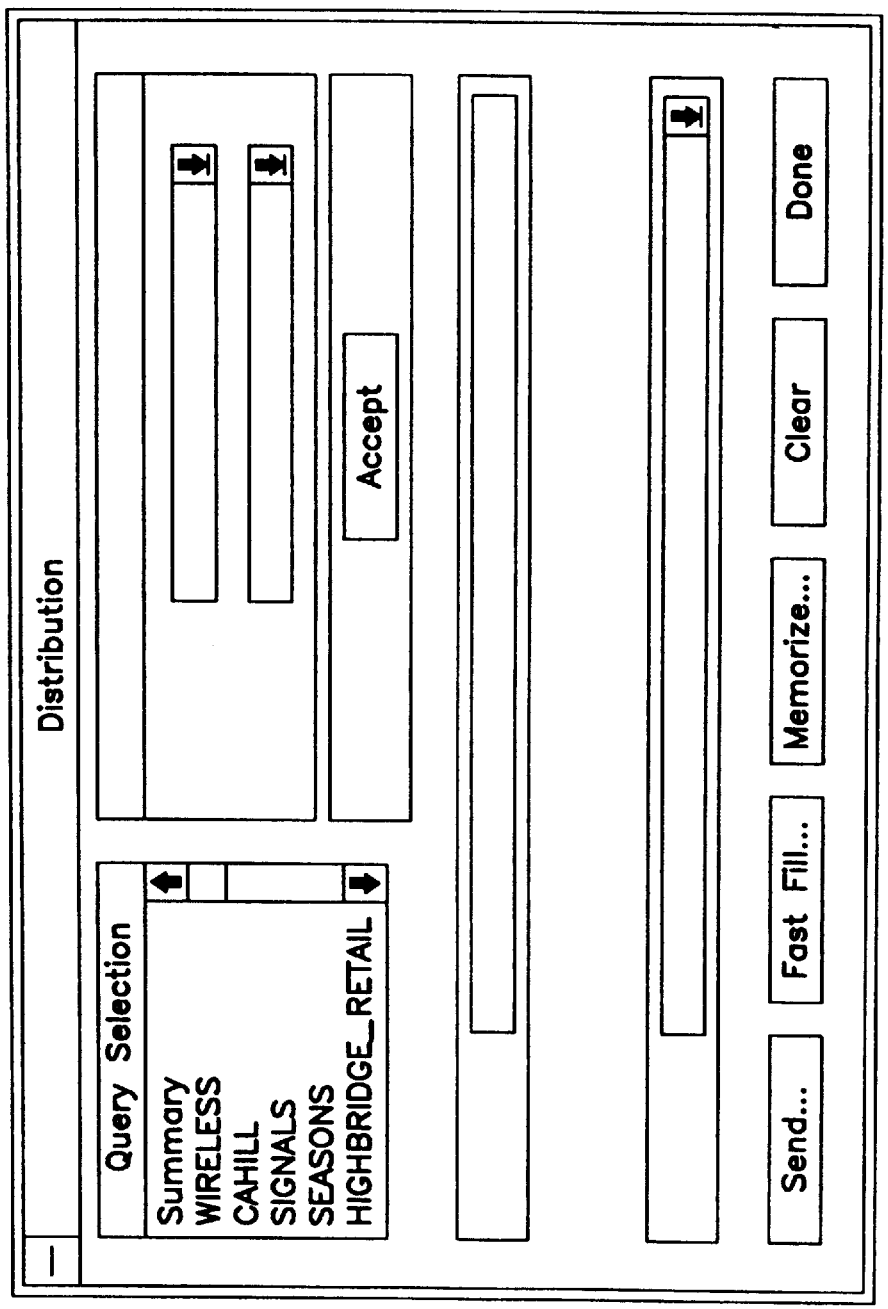
FIG. 7 is an illustration of the Distribution Screen of the client server windows software according to the present invention, which allows for the selection of any of the tables contained in the database and any set of ranges.

Database Links™ allows the user to find out additional information about customers beyond straight-forward counts. For example, if the above user wanted to find out the most recent purchase dates of the male Minnesotans, the distribution option would allow the user to select those customers and get a distribution of results on any of the fields in the database. The Distribution Screen is shown in FIG. 7. This screen allows for the selection of any of the tables contained in the database and any set of ranges (e.g., a date field may be lumped into months or weeks).

Two and Three Way Crosstabs

Figure 8:
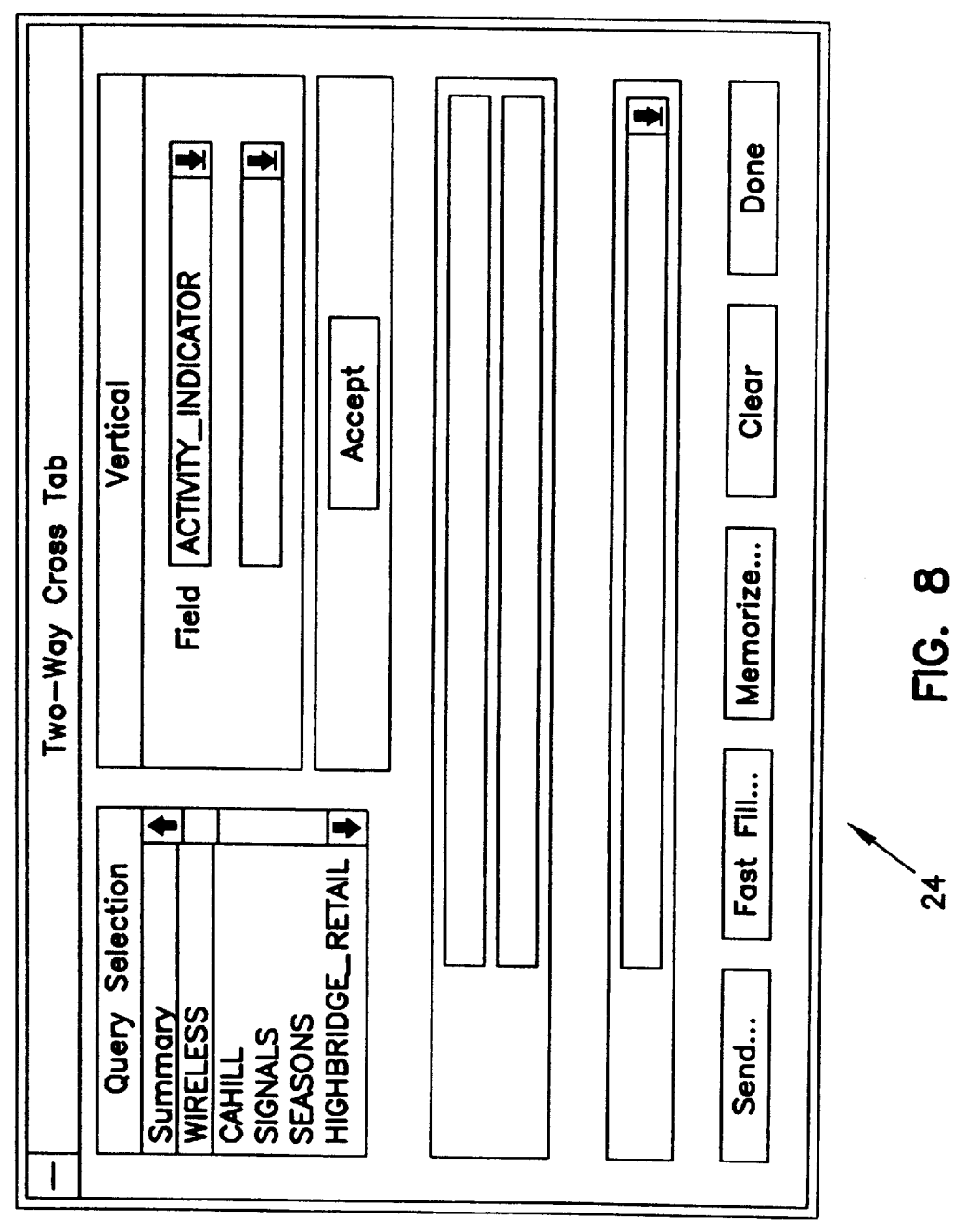
Figure 9:
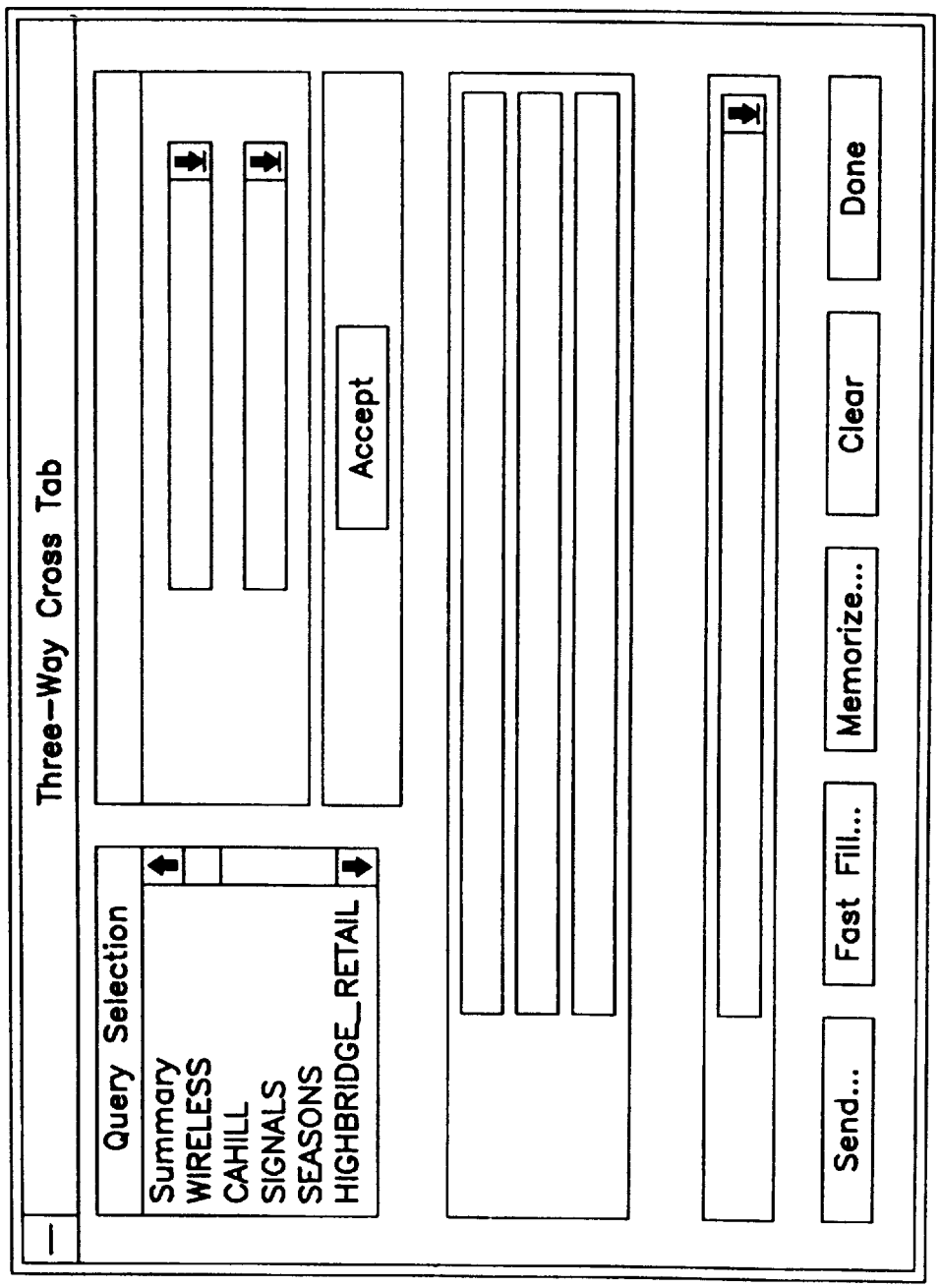
FIG. 9 is an illustration of the data tabulation screen of the client server windows software according to the present invention.
Figure 10:
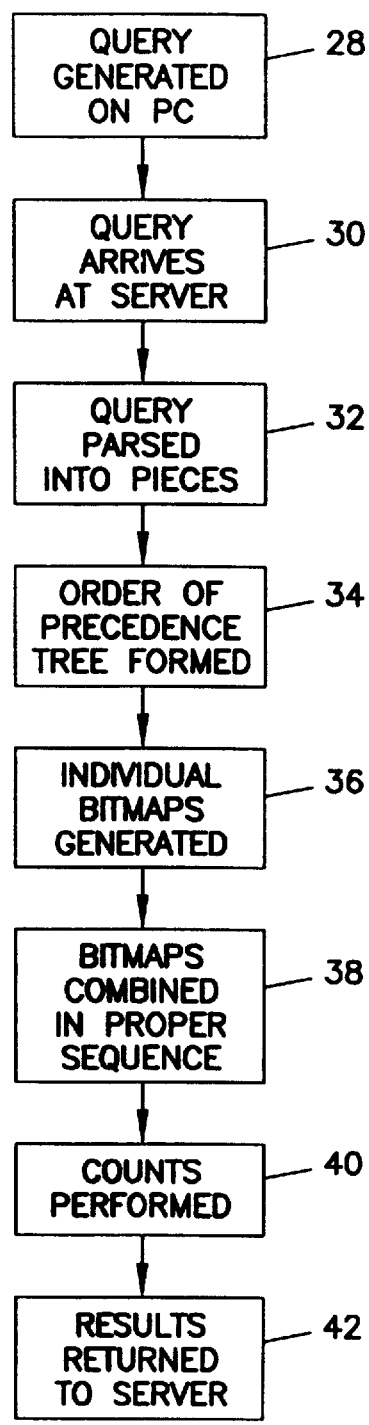
FIG. 10 is an overview block diagram of the query processing of the present invention.

In addition to distributions on a single field, Database Link™ also allows for results to be tabulated across two and three fields. The setup for this is shown in FIGS. 8 and 9. A table is chosen which defines a set of fields to choose from. This is followed by a specification of ranges for the field chosen.

Client Server

Hardware Specifics

Database Link™ server is currently optimized to run on a Digital Equipment Corporation (DEC) Alpha AXP server under the VMS operating system. The program is written in C and the core processes are nearly independent of hardware or operating system platform. The exceptions to the above are two-fold:

1. DecMessageQue (DMQ) is a messaging system that reliably moves information from one computer to another. Database Link™ uses this product to get information from the PC 10 to the server 14 and results from the server 14 back to the PC 10. This product is integral to the overall functioning of Database Link™. However, it has no impact on the uniqueness of patentability of the product. Other messaging systems are available that could provide similar or identical functionality. The system could easily be migrated to another product or to an entirely different hardware/software platform with no changes in functionality.

2. Global Sections. DEC VMS has a unique feature called global sections that allows the software engineer to map large sections of a disk file directly to an area in computer memory. Once this is done, any access to this area causes automatic swapping of data from disk to memory on an as needed basis. Essentially, this allows a program to contain multiple gigabytes of data that appear to be in memory at one time even though physical memory is only a fraction of this amount. A useful analogy would be to think of catching a hundred pound fish with a five pound test line.

Database Link™ uses this capability throughout its core functions. Rather than performing inefficient reads from the disk, the area of data that is needed is "mapped" to a global section and the operating system optimizes the access to this information. Because this operating system is very efficient at this type of memory optimization and swapping, this approach is very fast. It also allows an inherent multi-threading (more than one type of supporting process happening at the same time) that enables disk I/O to happen at the same time as data is evaluated at the beginning of a process.

Data Base Link evaluates data in a manner different than that which occurs in a standard relational data base. The data evaluation process is different because data is not stored in the server 14 of the present invention as it is normally stored in standard relational databases.

Data Structure

Figure 1:
FIG. 1 is an illustration of data records stored in a relational database in contiguous form for each individual customer listed in the database.

In standard relational databases, data is gathered and stored contiguously. In most cases, this contiguously stored data is in the form of a columnar record as illustrated in FIG. 1. The record represents the data stored on each individual direct marketing customer. It stretches across numerous fields, such as state, zip, age, income, city and gender.

Figure 3:
FIG. 3 is an illustration of data records stored in a relational database after 90 degree rotation and reprocessing so that data stored is contiguous for each field across all records.

When data within a standard relational database is modified for storage on the Database Link™ server, essentially, each record is removed, rotated by 90 degrees, and placed within the memory of the Database Link™ server 14. Rather than having all data stored contiguously for each individual customer, as shown in FIG. 1, the data for each field across all records/customers in the database is stored contiguously as illustrated in FIG. 3. For example, instead of having columns that are one thousand fields long for each of 1 million customers, as shown in FIG. 1, the structure has been modified to have one thousand (fields) that are 1 million bytes long, as shown in FIG. 3. Each column, as shown in FIG. 3 represent one field of data across all customers.

Effectively, this restructuring of data allows for simple questions, such as, for example, how many customers who are female, live in the state of Minnesota, and make over $25,000, to be answered by simply going through three columns (fields) of information, rather than all of the records for all of the customers which is done in a standard database query environment.

To illustrate this fundamental difference, we look to FIG. 1, illustrating a standard database of 1 million customers. Performance of a query, in accordance with the above example, of how many customers are female, live in the state of Minnesota, and make over $25,000, illustrates the difference between standard database data structure and that of Database Link™. Because the data is stored contiguously for each individual, as a record in a standard database, the information desired is only several (or at the most several hundred) bytes apart on the hard disk. The standard database system will read in the entire record, for each customer decode the 3 fields in question and make an evaluation as to whether or not the record in question meets the criteria that has been defined. This operation would be repeated for the million times that is necessary to complete the file. Specifically, the data for State followed by Zip, Age, Income, City, Gender and the remaining fields will be reviewed for each of the customer 1 million customers to determine which customers satisfy the query. If there are 1000 fields of data, there will be 1 billion pieces of data (1000 fields*1 million customers) reviewed.

On the other hand, in the Database Link™ structure, illustrated in FIG. 3, these three pieces of information are likely to be millions of bytes apart in the data file for any one individual. Searching back and forth to each field for each individual would totally negate the advantages that are inherent in the columnar data approach. The approach that Database Link™ makes is to evaluate all of the decisions for one field at a time. These results are then inter combined using a technique called bitmaps.

Specifically, when the above example query is performed in Database Link™, all of the data for the 1 million entries for state will be reviewed, followed by a review of the 1 million entries for income, followed by a review of the 1 million entries for gender. The total amount of data reviewed in the Database Link™ system is 3 million pieces of data as compared to the 1 billion pieces of data as shown for the standard database system.

This difference becomes meaningful in marketing databases, when there are millions of records and thousands of fields, as in the example above, illustrated in FIGS. 1 and 3. This example shows that the Database Link™ system reduced the amount of data reviewed by 997 million pieces, when compared to a standard database system. This reduction of data reviewed translates into faster query result times.

Because Direct Marketing databases involve large files, even simple queries, such as the above example, result in quite inefficient operations in the standard database system. In an attempt to reduce the inefficiencies, standard database technology uses keys (indices) to get faster access to a particular record in the file. These keys are stored and separated from the data and allow a database system to make certain decisions without reading the entire record. If the query that a user wants to make to a file involves data that is keyed, then the data can be accessed quite quickly.

Keys work very well in databases where nearly all of the queries are done against a few significant fields. For example, a customer service database can have keys by customer name, account number, and an order number. Information can then be retrieved by these keys in an almost instantaneous fashion. The problem with keys is that they require significant amounts of disk overhead to maintain. Keys can require up to 10 bytes of space for each record for each key. Thus, ten key fields on a 1 million customer file costs an additional 100 megabyte of disk storage.

Columnar (Inverted) File Structure

Database Link™ solves this problem by doing away with keys altogether. Rather than speeding up file access by setting up specific keys, Database Link™ speeds up file access by segmenting all of the information from one field together into one spot on the disk, thus dramatically reducing I/O and simplifying the process of evaluating criteria for reports.

This columnar file structure dramatically reduces the amount of I/O that is required for a particular query or set of queries. With this type of data structure, the Database Link™ server can scan a given query and identify which fields are necessary. A look-up table defines where this information is located and then only this particular part of the database has to be scanned to answer the particular query.

The challenge of this type of approach is in how to combine results across multiple fields, once they have been designated. The present invention uses a technique called bitmapping to address this problem.

Bitmaps

A bitmap is a series of computer words strung together in a one dimensional array. It looks at data as a series of bits rather than a higher level data type such as an integer or floating point value. A bitmap is viewed as a uniform series of bits and within that bitmap, the word boundaries that are normally meaningful in how the computer "chunks" up its information are meaningless. Each bit represents a piece of data that can be a yes or a no.

Bitmaps are used to mark all records within a particular column that meet a criteria. For example, if the criteria is "gender is male", then a bitmap is created that has as many bits as there are records for that particular database table. For each record where the gender attribute is set to male, the corresponding bit in the appropriate bitmap is set to a 1=yes.

The major advantage of bit level data is that it allows for the storage of huge amounts of yes/no type of information within a relatively small amount of space. Because of the eight to one ratio of bits to bytes, a database with 2 million customers can be represented with 250,000 bytes of internal data.

Figure 11:
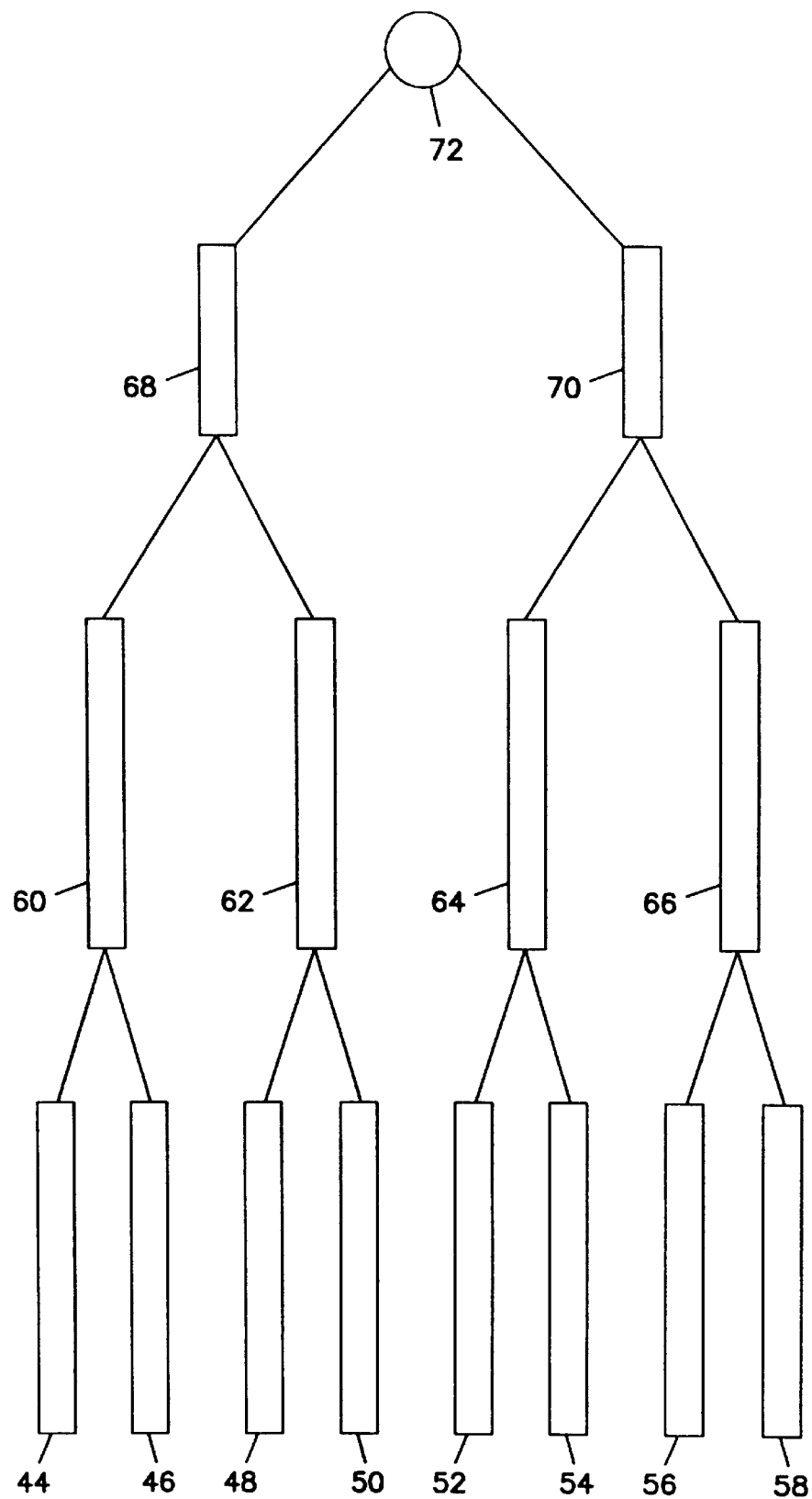
FIG. 11 is an overview block diagram of one method of combining multiple bitmaps resulting from a complex query.

Bitmaps provide another advantage to the Database Link™ paradigm: they can be combined together in a very rapid fashion to provide complex results. Very few database queries actually consist of only one criteria as in the above "gender is male " example. Most queries consist of many criteria that are combined in some fashion using boolean arithmetic to arrive at a final subset of customers that is meaningful to the requester of information. In these types of cases, several bitmaps must be combined together to form some type of aggregated result. FIG. 11 illustrates one method of combining multiple bitmaps resulting from a complex query.

For example, for the query select all "males who live in the state of New York", two bitsmaps can be computed—one for all males and one for the residents of the state of New York. The answer to the composite of these two criteria can be derived by doing a very fast bit-level And operation. With current architecture supporting 64 bit operations, data is stored in chunks of 64 bits. This allows for one CPU instruction to perform the equivalent of 64 And operations if they were performed on a record by record level. Thus, for the query to select all males who live in the state of New York, rather than combining the two bitmaps generated from the 2 fields, the computer actually combines the 2 bitmaps in chunks of 64. Logically however, bitmaps are combined bit by bit. For instance, customer X meets the query criteria if the bit in each bitmap corresponding to customer X is set. However, the computer as explained above combines combines the bitsmaps 64 bits at a time.

The 64 bit processing performed by the computer speeds up the process of determining whether a particular customer satisfies the query while using less memory. In contrast, standard relational database processing examines an entire record to determine if the query is satisfied, and then proceeds to the next record. This standard method required one operation for each record. Since the present invention processes 64 bits at a time rather than one operation for each person, processing can be performed for 64 people in parallel. This produces a dramatic reduction in the amount of work that the computer has to do. This is possible due to the fact that the server looks at words multiple bits at a time. Therefor because 64 bits are stored as a word, when bitmaps are combined it can be determined whether 64 people satisfy a given criteria for one combination.

It is only after the computer has done word combinations that a searcher can go back and look through at each bit to determine whether a customer actually met the criteria and very quickly get a count of how many actually met the criteria.

The challenge that must be met when using this approach is how to count bits within a bitmap in a very efficient fashion. All of the above gains would be lost if it required large amounts of CPU to count the bits that are contained in a results bitmap. The present invention includes a procedure whereby a mapping algorithm is used to take 16 bits at a time, convert them to an integer value (0 to 65,611) for use as an index into an array of that length that stores the number of bits contained within that 16 bit segment. This approach allows for very rapid bit counting across very large bitmap arrays.

Iterative Capability

Many of the procedures that marketing professionals perform are iterative in nature. One query provides information that is used to further define a particular query. For example, a company may have a budget to mail 100,000 catalogs to its customers and the marketing director needs to define the optimal target audience to optimize the value of this mailing. The user of the system would like to test different date and dollar range combinations to produce this exact number. Database Link™ models this real world situation by storing a "ring" of the 20 (or whatever number optimizes performance with the resources available) most recent queries that have been used by a particular user. Each node on the ring contains query definition as well as a bitmap of those records that met that particular criteria. As new queries are entered, they are broken down into pieces and each piece is matched against the queries that are stored in the ring. If a match is found, then the query does not have to be reexecuted. The present invention uses a basic FILO (first in, last out) algorithm for tracking which queries to store in memory. To further optimize the performance of the overall system, with more sophisticated weighting algorithms similar to those used in contemporary operating system memory swapping algorithms could be used.

FIG. 11 is illustrative of a complex query having multiple bitmaps 44, 46, 48, 50, 52, 54, 56 and 58. Each of the bitmaps 44, 46, 48, 50, 52, 54, 56 and 58 stores the result of a particular query on a field of data. These bitmaps can be combined by the CPU using logical operations such as AND and OR to produce increasingly complex query results 60, 62, 64 and 66. As explained above, the processing of this bit information is extremely efficient since a single CPU instruction can operate on the bits corresponding to 64 customers in parallel. If bitmaps 44, 46, 48, 50, 52, 54, 56 and 58 are stored on the ring, and a new query matches bitmap 48, then this new query is not recalculated. The elimination of this processing further reduces search time.

Relational Structure

Figure 4:
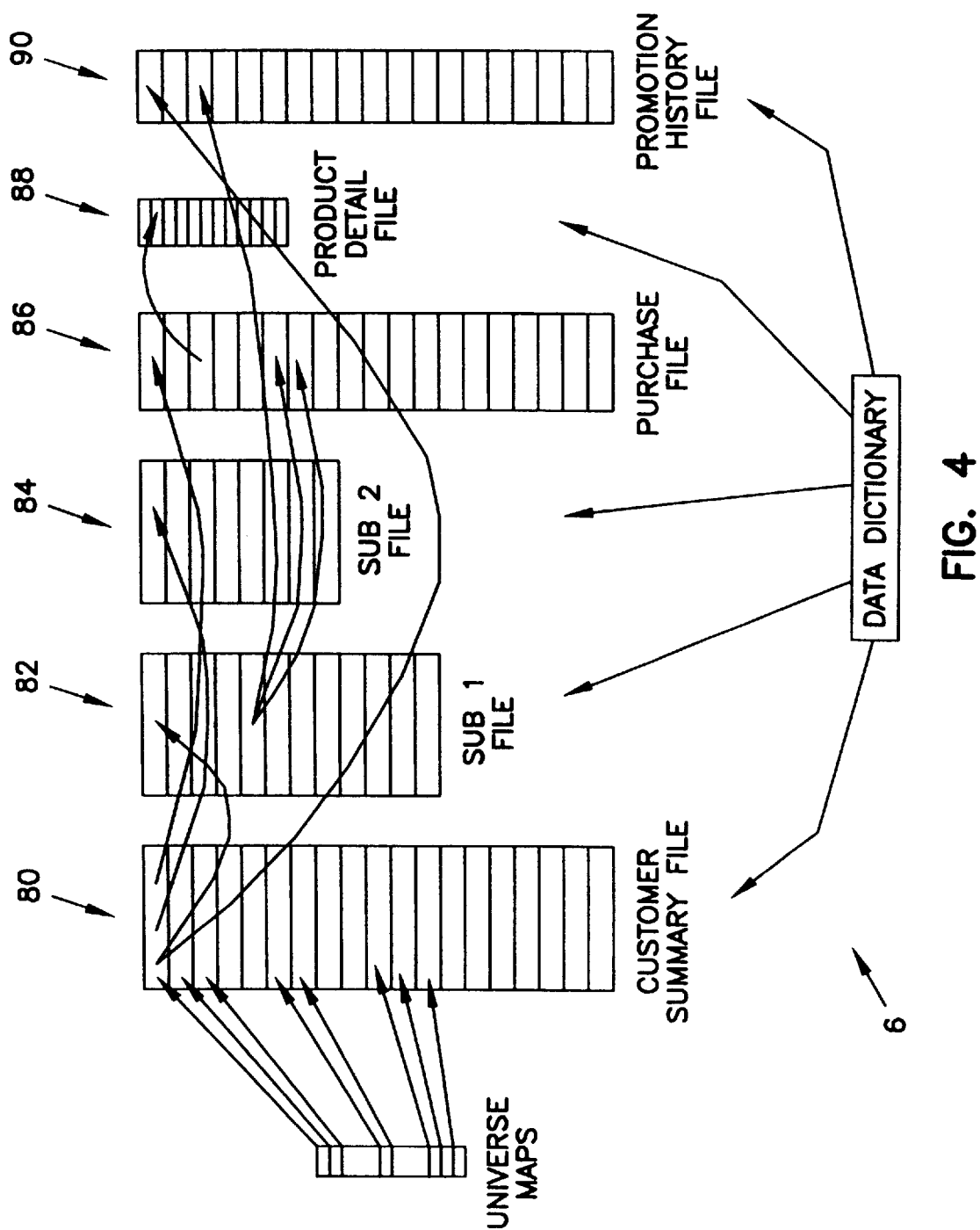
FIG. 4 is an illustration of the file structure types used by the present invention.

Database Link™ has made a third advance in making this technology work for marketing applications: it allows for relational marketing queries. As shown in FIG. 4, most of the applications that use any of the unique types of data storage contained in Database Link™ are flat-file paradigms: they enable fast and efficient queries against one rectangular file, not several files joined together in a more real world representation of data. Database Link™ actually stores inverted indices to gain access across multiple data tables.

Complex Bitmap Processing

Customer Level

As shown in FIG. 4 Database Link™ involves a number of different file structure types. In the embodiment illustrated in FIG. 4 there are a number of different file types: customer level 80, subsidiary level 82 and 84;, purchase tables 86 product/line item detail 88 and promotion history 90.

Customer level information is the hub of the Database Link relational structure. The data is stored with one record of information for each customer. The information stored within the customer summary file as shown in FIG. 4, would be information uniform to all listed customers. For example all customers have an age, income level, gender and state.

Subsidiaries

Subsidiaries 82 and 84 represent data that is present for a portion of the customer table, thus it represents a one to few relationship. Each subsidiary is mapped back to the customer record with a bitmap that contains one bit set for each record in the subsidiary table that matches the customer record.

Purchase table

The purchase table 86 contains multiple records for each customer. Each record represents one activity transaction made by a particular customer. The purchase table is linked to the customer level table by an index that contains the number of purchases for each customer. Customer records and purchase records can be joined together by starting at the top of the respective columns and referencing the appropriate element within the purchase column.

Product/Line Item Detail

Product level detail 88 is stored in a similar fashion to purchase level data. The additional complexity is that this level of information is many-to-one with customer as well as with purchase level information. Two index arrays are used: one for customer to product level and the other for purchase to product level.

Promotion History

Promotion history information is stored in the same format as purchase level information 80. Each record represents one promotion event.

Data Types

Database Link supports a variety of data types. Where possible, all data is stored in a binary format to minimize storage requirement and maximize throughput.

Characters

Character data is stored in a single byte, ASCII character set format. Data may only be in the range of valid ASCII printable character set. At the present time, Database Link stores all alphabetic data in an upper-case format.

The operators that are available for all character fields are shown in Table 1.

TABLE 1

| Character Fields | |
| --- | --- |
| is | is equal to any member of the list of values that follows |
| is not | is not equal to any of the members of the list of values that follows |

Strings

Strings are fields that contain 2 or more characters for a particular field.

Because of the wide use of strings that have a certain finite number of valid formats (e.g., catalog numbers), Database Link uses a hashing function/look-up approach to storing this information as an integer pointer to a table that contains the actual values. This approach allows the storage of up to 65000 unique values in a two-byte integer field. Given that typical strings of this type are 8 to 12 bytes in length, this technique provides an average of 5:1 data compression without any loss of data. Additionally, this data approach allows for integer word comparisons instead of byte by byte string comparisons that require many additional CPU cycles.

Valid operators for strings are as shown in Table 2.

TABLE 2

| Valid Operators | |
| --- | --- |
| is | is equal to any member of the list of values that follows |
| is not | is not equal to any of the members of the list of values that follows |

Integers

All integers are stored in a standard binary format of 1, 2, or 4 bytes in length. This allows for maximum efficiency in terms of access and storage.

Valid operators for integers are as shown in Table 3.

TABLE 3

| Valid Operators for Integers | |
| --- | --- |
| >, <, >=, <=, = | Basic boolean numeric operations |
| over | greater than or equal to the value following |
| under | less than the value following |
| is | is equal to any member of the list of values that follows |
| is not | is not equal to any of the members of the list of values that follows |

Dollars

Dollars are stored as integers with number of cents. Operators are the same as for integers.

Dates

All dates are stored in number of days since Jan. 1, 1888. This modified Julian type of approach allows for dates between 1888 and 2064 in a two-bytes (16 bit) integer format. Storing dates in this fashion allows for efficient operations.

Valid operators for integer are as shown in Table 4.

TABLE 4

| Valid Operators for Integers | |
| --- | --- |
| >, <, >=, <=, = | Basic boolean numeric operations |
| after | greater than or equal to the date following |
| before | less than the date following |
| within | DBLink has a special capability to select all records that are within a certain number of days, weeks, or months of today's date |
| during | DBLink has the capability to select based on a seasonal basis: all records within a certain season across a certain number of years |
| is | is equal to any member of the list of dates that follows |
| is not | is not equal to any of the members of the list of dates that follows |

Floating Points

Floating point values are stored as integer to reduce space and increase processing efficiency. An implied decimal point is stored with the data to allow for various decimal precisions. Operators are the same as for integers.

Bitmaps Defined

In Database Link™, bitmaps are used to mark all records within a particular table that meet a criteria. For example, if the criteria is "gender is male", then a bitmap is created that has as many bits as there are records for that particular database table. For each record where the gender attribute is set to male, the corresponding bit in the appropriate bitmap is set to a 1.

Creating Bitmaps

Many marketing queries consist of a list of values rather than a specific single value. For example, the marketing question: How many customers made their first purchase during Christmas season over the past 3 years? would translate into a series of ranges that might be as follows:

First_order_date is 10/15/91-12/31/91, 10/15/92-12/31/92, 10/15/93-12/31/93

A standard SQL database would reduce this to a series of "OR" queries with each individual range translated into a between construct. This type of approach would be very inefficient for Database Link which must go through an entire column for each of the three sub-segments of the query. Thus, Database Link includes a facility for evaluating a complex set of ranges and unique values in one pass of the data file. A list can consist of a series of values separated by commas or dashes. The comma signifies a unique value and a dash signifies all values between the value in front of the dash and behind it. Because all of these values are handled as one criteria, it is the equivalent of having a series of ORs representing each comma and the entire expression enclosed in parenthesis, thus forcing it to be evaluated in one lump for each individual in the table.

Database Link also supports a variety of wild card conventions for all string types. The most straight-forward of these capabilities include the following four wild card characters:

*,#,@,?

The asterisk (*) provides a means of matching all characters to the end of a particular string. A pound sign (#) matches a single numeric (digit only) character. The at sign (@) matches a single alphabetic character (A-Z).

Field Comparisons as a Special Case

In all of the above examples, the criteria has been a fixed value. That is, a field of variable information is compared to a specific fixed value or list of values. In some cases, it may be desirable to compare two fields together to find a particular result. For example, the question: How many customers purchased more on their most recent purchase than they did on their first purchase? can only be answered by comparing the two pieces of data together in a pair-wise type of fashion.

Cross Table Comparisons

Database Link has the capability of comparing information across tables in various types of join operations. Each of these comparisons is done by combining bitmaps of specific within table information together in a particular fashion.

Subset Comparisons

Subset comparisons involve the synchronization of data between two columns where the data in each column does not match one to one with the data in the comparison column. Database Link handles these comparisons by using the customer level information as a reference. Database Link maintains a bitmap for each of the subsidiary tables as to which data records are contained in that particular table compared to the customer table.

Many-to-one Comparisons

Many-to-one comparisons are much more complex in Database Link than other types of comparisons. Many to one comparisons allow for the joining together of one customer with one or more purchase/activity records of one or more promotion types of records.

Patterned Comparisons

The above descriptions apply to basic many-to-one comparisons. Database Link also has the capability to apply various patterns of comparisons to this comparison. Thus, rather than looking for the presence of any records that meet a particular criteria, the user may want to know whether the first record only meets a criteria. The types of comparisons that Database Link allows are shown in Table 5.

TABLE 5

Database Link Comparisons

| | |
|---|---|
| First | The first record must meet the criteria specified. If no records exist; then the comparison fails. |
| Second | The second record must meet the criteria specified. If a second record does not exist, then the comparison fails. |
| Third | The third record must meet. the criteria specified. If a third record does not exist, then the comparison fails. |
| Last | The last record must meet the criteria specified. If no records exist, then the comparison fails. |
| Next to last | The next to last record must meet the criteria specified. If at least two records do not exist, then the comparison fails. |
| After first | At least one record after the first record meets the criteria specified. If only one record exists, then the comparison fails. |
| Last 2 | At least one of the last two purchases must meet the specified criteria. |
| Last 5 | At least one of the last five purchases must meet the specified criteria. |
| Multiple | Multiple records must meet the criteria. |
| Two | Two or more records must meet the criteria. |
| Three | Three or more records must meet the criteria. |
| Total | The total of all records must meet the criteria. |
| Average | The average of all non-missing values must meet the criteria. |
| Count | A certain number of records must meet a specific criteria. |

Domains

Domains allow for further constraints on the relationships with many transactions to one customer. For each of the above patterns of relationships, domains allow for the restriction of records to a certain subset of the actual records that are subject to the pattern matching. For example, suppose the user wanted to know how many customers had three purchases of $25 or more during 1992. A domain could be defined that would limit transactions to 1992. The following query would then get the answer to this question:

Three$_1$purchase.order_amount over 25

In this example, the domain would limit transactions to the year of 1992 and the query would count those customers who had at least 3 purchases over $25.

Universe Maps

Users frequently use the same query on many different occasions. Database Link can save these queries as a universe and save the cost of creating the bitmap. Universe maps can be an individual query of the complex combination of several different queries put together.

Query Processing

The processing of the query is handled in a sequential fashion and is shown in Table 6.

TABLE 6

Query Processing

| | |
|---|---|
| Step 1 | The server receives the query from the user as an ASCII character string. All queries are placed in a buffer where they are accessed as the query engine is available for processing. Once removed from the queueing buffer, the query is parsed into a series of basic queries. For example, the query:<br>Gender is male and State is Minnesota:<br>would be parsed into two basic queries with an and operator connecting the two together. |

TABLE 6-continued

Query Processing

| | |
|---|---|
| Step 2 | The individual pieces of the query are placed on a decision tree with each branch node containing either a basic query or an operation. The above example would contain two branches with a basic query element at the end of each branch. More complex queries containing parentheses and various combinations of ands and ors would be broken down into more complex branch structures representing the proper order of precedence. |
| Step 3 | DBLink processes each of the queries at the end of each of the nodes. The result of this processing is a series of bitmaps that represent the results of each of these queries. |
| Step 4 | DBLink proceeds to combine the bitmaps together based on the operators that reside at each of the junctions between the individual queries. Once this process has been completed, an overall bitmap representing all of the table elements that meet a certain criteria has been; created. The bits that are set on this map are then counted and the result is returned to the client. |

Post Query Processing

After the queries have been processed and a final result has been created, it is typical that additional information needs to be gathered about the customers that have been selected and counted. Reports and other information can be generated by Database Link.

Activity/Line Items Spec

Marketing databases often contain a complex relationship between the customer level data, activity level data, and product/line item level of data. Within the Database Link Database, there is a many-to-one relationship between customer level and activity level records. Additionally, there is a many-to-one relationship between activity records and line item records.

Query Level

One of the most complex issues in dealing with queries at the purchase and line item level is the level of outcome for the query. The level of outcome is whether or not a resultant count is in customers, activity transactions, or line items. The level of outcome is totally separate from what information is used to compute the result. Thus, customer level results may use purchase and line item level information while line item level results may be affected by purchase level information. There are essentially three levels of queries across the Database Link system:

Customer level queries. Customer level queries are by far the most common type of queries in Database Link. The result of a customer query is the number of customers that meet a certain criteria. The most common type of customer level query is the query that is asked at the customer level: For example, "gender is male " will give you an answer that says how many customers are males.

One may also want to answer queries at the customer level that are based on information at the activity or line item level. For example, one may want to know how many customers bought over $50 worth of line item in 1992. This requires information from the purchase and line item level to be summarized into an answer regarding the number of customers. These types of queries all begin with some type of prefix that tells Database Link to take this query to the customer level.

Activity Level Queries. Activity level queries give results that are at the level of individual transactions. A typical question might be: how many purchases were made in 1992 from the Teens and Tots Catalog. The resultant answer would be the number of transactions that met all of these criteria. This answer will not say how many customers made these transactions, only the absolute number of transactions that were made at this criteria.

Line Item level Queries. Line item level queries give results that are at the level of individual line items within a particular activity. A typical question might be: How many 486 computers were sold in the first four months of 1993. The resultant answer would be the number of items that contained a 486 computer.

Query Domains

Query domains are parts of queries that restrict the range of records that are used by another part of the same query. They have little meaning by themselves, but provide "staging" information for another part of the query. Query domains can also be applied at any of the three levels that queries can be constructed. Examples of the types of questions that are answered using domains are as follows:

1. How many customers bouaht over $100 in 1992? In this case the domain is all activity transactions that occurred in 1992.
2. How many purchases were made in 1992 from the Teens and Tots catalog that included teen clothing? The domain for this question is the activity transactions that included a teen clothing line item.

Activity Queries

The Query Type. The query type defines the pattern of relationship that is to be selected from amongst the activity records for a particular customer. Examples of query types include first activity, second activity, or last activity. The result of this query is the number of customers who have activity records that meet the specific criteria.

Some query types are unique in that they refer to one specific record. The above examples all refer to a decision that can be made on one record. Other activity queries such as last 5 activities look to see if any one of the past five activities meet the criteria of the query.

Special Types. All of the query types that are defined above work in a similar manner. There are three types of special queries:

Total_activity: The total activity query looks at the total amount that follows. An example:
Total_activity:amount over $50.
Average_activity: The average activity query looks at the average amount that follows. An example:
Average_activity.amount under $20.
Activity_count: The activity_count query is unique in that it does not have any field name that follows. It only counts the number of activity records that meet the criteria. An example: Activity_count over 2.

The Activity Domain. The activity domain defines the domain of activity records that are to be included in the query. This domain defines the "aperture" that frames those activity records that are to be included in the particular query type. An activity domain consists of a series of activity level queries that are combined together to define a bitmap of activity records that are to be considered for the particular query type. For example, an activity domain could be defined to be 1992 purchases. The activity domain could be named 1992_purchases and be defined as activity.order_date during 1992 and activity.amount over $0. The full query first_activity.amount over $50 and activity_domain is 1992 purchases. This query would select all customers whose first purchase in 1992 was over $50.

All activity domains are defined as a function of pure activity functions. For example, a domain cannot be defined to be first_activity.amount over $0.

The Line Item Domain. The activity domain defines the domain of activity records that are to be included in the query. In the case of an activity query, the line item domain also restricts the domain of activity records that are considered. The line item queries are first combined into one result and activity records are marked that have any records that are marked. One could then define the following domain as large_shoes: line item.code is shoes and line item.size gt 10. The activity query: first_ activity.amount over $50 and activity_domain is 1992_ purchases and line item domain is large_shoes would select those customers who had a first purchase over $50 in 1992 when that order included large shoes.

Multiple Domains. Domains can be combined together to form very complex selections of activity records and in turn customers. One could define a query to be: last_ activity.amount over $50 and activity_domain is 1992_ purchases and activity-domain is 1993_purchases and line item-domain is large shoes.

Line Item Queries

Line item queries are much more limited in scope than purchase queries.

The Query Type. The only standard query type is any_line query. This query groups all line items together into one batch and performs a simple query. This would be identical to making any_activity query with a specific line item domain. However, because the activity level definition is not needed, using the any_line item definition would be considerably more efficient.

Special Types. All of the query types that are defined above work in a similar manner. There are three types of special queries:

Total_line item: The total activity query looks at the total amount that follows. An example:
Total_line item.amount over $50.
Average_line item: The average activity query looks at the average amount that follows. An example:
Average_line item.amount under $20. Line item_ count: The activity_count query is unique in that it does not have any field name that follows.
It only counts the number of activity records that meet the criteria. An example Purchase_count over 2.

All line item queries can be followed by any combination of purchase and line item domains. The only difference is that purchase level domains must be expanded to the line item level rather than having line item level data reduced down to the purchase level. In this case all of the line item level records that meet the criteria of the purchase domain are marked. For example: Total_line item.amount over $50 and line item-domain is large shoes and purchase-domain is 1992_purchases would select all customers who bought over $50 worth of large_shoes in 1992.

Database Link Reports

The Database Link reporting engine is the direct complement to the other part of the Database Link program: the query engine. The query engine's primary task is to identify which individuals are to be examined. Each individual that is to receive special attention has a bit set that marks the record for special consideration. The reporting engine accumulates some type of information about those individuals that have been marked.

The basic idea of the report engine is to accumulate counts or totals into an n-way data matrix. Each of the dimensions of the data matrix is defined by one of the dimension objects that are allocated off of the report structure.

The object-oriented approach allows for a wide variety of reports to be built around a few core data structures and functions.

The Report Structure

The report structure contains all of the data and program code to execute a particular type of report. A report is of a particular type. A report consists of a series of dimensions (up to five).

TABLE 3

```
typedef struct{
    int         report_type;
    int         n_of_dim;
    DIMENSIONS  *dim [5];
    BITMAPS     *reference[5];
    int         joining_tables;
    MATRIX      counts;
    MATRIX      profits;
    MATRIX      orders;
    MATRIX      sales;
}REPORT;
```

The Dimension

A dimension stores all data and processes relating to a particular dimension in a report. Currently, Database Link is set up to process reports for up to four different dimensions. A dimension consists of several basic pieces of information: a field in the database, a pointer to a column of data, a set of labels, and a look-up function together with associated working structures. The current definition of the dimension structure is as follows.

TABLE 4

```
typedef struct DIMENSIONS{
    FIELDS          *xfields;
    unsigned char   *data;
    unsigned char   *start_address;
    int             channel
    int             (*lookup_fxn) ();.
    char            table_name[30];
    TABLE           *hash_table;
    unsigned short  *lookup_map;
    unsigned char   **lookup_map2;
    LABELS          *labels;
    int             current_label;
    int             max_labels;
    int             start_pos;
    int             bytes_to_move;
}DIMENSIONS;
```

In the above structure, the first element points to a structure called xfields. This substructure contains the information relevant to the field that is being used for a particular dimension.

The next several lines contain information about the actual column of data to be processed by this particular report. The data is a pointer to a particular element of data within a column of data for a particular record of data. The *start_address is the address of the beginning of the data column. This is the point where the column begins, independent of where processing might be at a particular point in time. This data element is used for reports that must be reset and reprocessed several times.

The next several lines within the dimension structure are used to take a data point and perform a lookup function that returns an index into a set of data arrays. The pointer *lookup_fxn( ) is a pointer to a function that is unique to the particular data type that is specified in the xfields data structure. The various lookup functions are specified in the following section. Hash_table, lookup_map, and lookup_map2 are data structures used by the various lookup functions.

The last block of elements within the dimension structure relates to the labels that are used along that particular dimension. For example, in the case of a dimension based on gender, the labels would consist of male, female, and unknown. The labels data structure contains an array of label structures, each consisting of the following elements:

TABLE 5

```
typedef struc{
    char    *banner;
    int     position;
    int     low_level;
    int     high_level;
    char    char_value[10];
}LABELS;
```

The banner is the actual label to be printed on the report while the other elements are used for the actual creation of a report.

The current_label element on the dimension structure is an index to the next available label. This is used in situations where the values are not known ahead of time and the list of labels is being filed in a dynamic fashion. The max_labels is an element that is the total number of labels that are used for a particular dimension.

The Lookup Routines

The lookup routines are the critical functions that take an incoming data point and use the data stored on the dimension structure to determine an index value to the data matrices for a report. There are several types of data structures, each optimized for a particular type of data and whether or not the values for a dimension are known ahead of time.

Character Fields

Character fields use an unsigned character and thus have a maximum of 256 unique values. Characters can thus be mapped to a particular index by using an allocated array of 256 values. For each data point that needs to be evaluated, the data value of the unsigned character can be used an index into an array of shorts that contains the value to be assigned. This represents the most efficient method of performing a lookup function.

Small Integer Fields

Small integers are stored in one byte fields and thus are mapped in a similar fashion to single character data fields.

Medium Integer/Date Fields/Fixed Strings

Medium integers, dates, and fixed strings are stored as 16-bit integers and thus have a maximum value of 65535. These fields are also dealt with as a single lookup operation on an array of shorts that is 65536 elements long. Each element contains the index value to the data matrix.

Large Integer/Dollar Fields

Because of the very large number of possibilities for a large integer, it is not possible to use a simple map function to put individual values to particular index values. However, because most integers (dollars in particular) are between 0 and 20,000, it is possible to directly map these smaller values to an index while using more computer intensive methods only for the larger values.

If the value exceeds the length of the map (20,000), then these alternative methods are used. If pre-defined ranges are in effect, then a simple loop is used to evaluate each of the ranges. If no ranges are in effect, then a hashing system similar to that used in character strings is used to efficiently map the values to a particular output.

Character Strings

Character strings are the most inefficient data type to process. The lookup function for characters uses the same hashing function that is used in the load program. The character string is hashed into an array of pointers to linked lists. Once the top of the list is accessed, the lookup function traverses the list until a match is found. If no match is found, then a new link is added at the end of the list.

A special case of character strings is the field that contains exactly two characters. Several commonly used strings such as state and country codes use two character fields for storage of data values. Because valid ASCII character values must be between 1 and 128, it is possible to build a 2 dimensional 128 by 128 matrix (16384 total elements) that stores the index value for each possible combination of the two characters. This allows for using the two characters as indices into this array that contains the index into the data matrix.

Report Processing

Once the report and dimensional structures have been populated, the processing of reports proceeds. This is always a two-part process: 1) a bitmap is set that determines which cases will be included in a report, then 2) the query engine proceeds to fill the data matrix with accumulated data. The following is an outline in pseudocode for the creation of simple two-way cross-tabs reports:

```
setup report two-way matrix
setup row dimension
setup column dimension
for each case in the table
    is current bit in bitmap set
        row = lookup of row data
        column = lookup of column data
        report.matrix[row] [column] increment by 1
    increment row data
    increment column data
    increment to next bit in bitmap
```

Once all of the set up has taken place, the actual processing is quite simple. Prior to the actual generation of the report, a query has been executed that produces a resultant bitmap that marks every "record" in the table that should be included in the report. During the setup of each dimension, a pointer to the top of the data column for that particular dimension is created. In the case of a two-way crosstabs, this involves the setting of two pointers—one for the row variable and one for the column variable. The dimension structures also are set to point to the appropriate lookup functions. The most common application of this is for tracking data on multiple purchases for one individual. With this type of many-to-one relationship, there are many possible patterns of relationships that can be formed. We have developed specific retrieval functions that allow us to get at data relating to the first and last purchase that a customer has made in a particular mode.

What is claimed is:

1. A computer implemented method of searching a relational database, comprising the steps of:

(a) querying a plurality of data fields by means of a client server interface program, wherein said client server interface program is loaded onto a personal computer where said queries are entered and processed into packets, said packets being sent to a database server;

(b) receiving said packets by means of a program executed by said database server, said database server storing a database where all database records are rotated 90 degrees such that data for each field is stored contiguously across all customers;

(c) retrieving data from said database corresponding to the field contained in said packets, wherein data from other fields is not retrieved;

(d) comparing the query from said packets to the data retrieved from said database;

(e) creating bitmaps indicating the results of said comparisons, wherein said bitmaps are one-dimensional arrays;

(f) combining said bitmaps in a sequence to create a results bitmap forming an aggregated result;

(g) counting the number of bits in said results bitmap by converting said results bitmap into integer values, wherein said integer values are used as an index into an array containing the number of bits set to determine the number of records in said database which match the query; and (h) sending query results back to the client server interface program.

2. The computer implemented method of claim 1, wherein said client server interface program includes means for cutting, copying, pasting and inserting cells, rows and columns of data.

3. The computer implemented method of claim 1, wherein said client server interface program includes means for accumulating multiple queries and batching said queries for submission together to said database server.

4. The computer implemented method of claim 1, wherein said client server interface program includes means for parsing said query into a plurality of pieces where each said piece relates to only one field of the database.

5. The computer implemented method of claim 1, wherein said client server interface program includes means for accumulating different queries to be combined into a single complex query.

6. The computer implemented method of claim 1, wherein said database server includes a programmed processor that processes said queries by performing the following steps:

(a) scanning said query for a determination of which of said contiguously stored data fields will be accessed to answer said query;

(b) accessing queried data fields; and (c) processing said queried data fields to determine which field entry within said contiguously stored data fields satisfy said query.

7. The computer implemented method of claim 1, wherein said database server includes a program processor that further includes an interactive processor, said interactive processor carries out the step of storing a set number of the most recent queries executed by a system user and the bitmaps associated with said most recent queries from said queries to eliminate bitmap processing for generation of bitmaps for common queries.

8. The computer implemented method of claim 1, wherein said queried data fields have columnar identifiers assigned to each of said fields, said identifiers being indexed to a look up table.

9. The computer implemented method of claim 1, wherein said step of combining the bitmaps into a results bitmap is performed by ANDing chunks of at least 64 bits from each bitmap in a parallel fashion.

10. The computer implemented method of claim 1, further including the additional steps of:
 (a) Parsing said query into a plurality of pieces where each piece relates to only one field of the database;
 (b) storing a plurality of the most recent bitmaps along with a query piece definition associated with each bitmap; and
 (c) comparing each said query piece definition with each said piece of said query to determine whether said query piece is to be compared against a relevant field of all database records.

11. The computer implemented method of claim 10, further including the additional step of skipping the processing of said piece of said query which matches said query piece definition.

* * * * *